3,329,577
FERMENTATIVE PREPARATION OF PROLINE
Shinji Okumura, Yokohama-shi, Kanagawa-ken, and Fumihiro Yoshinaga, Shimpachi Konishi, and Noboru Katsuya, Kawasaki-shi, Kanagawa-ken, Japan, assignors to Ajinomoto Co., Inc., Tokyo, Japan
No Drawing. Filed Mar. 23, 1965, Ser. No. 442,198
Claims priority, application Japan, Apr. 20, 1964, 39/22,008
4 Claims. (Cl. 195—29)

ABSTRACT OF THE DISCLOSURE

Preparation of proline (2-pyrrolidinecarboxylic acid) by culturing auxotrophic mutants of *Brevibacterium flavum* requiring isoleucine, ornithine, citrulline, arginine, or histidine for growth. Ammonium sulfate in culture medium may improve yield of proline.

---

This invention relates to the manufacture of optically active proline, and particularly to a method of preparing proline by fermentation.

We have found that economically signifiant amounts of L-proline are found in fermentation media in which certain artificially induced mutants of *Brevibacterium flavum* No. 2247 (ATCC No. 14067) were cultured, the concentration of proline in the media being as high as 1.5 grams per deciliter under favorable conditions. The mutants are auxotrophic and characterized by their requirement for at least one member of the group consisting of isoleucine, ornithine, citrulline, arginine, and histidine. They can be isolated by virtue of this fact in a conventional manner from vegetative cells of the parent strain which were subjected to ultraviolet radiation, X-rays, gamma-rays, or contact with sodium nitrite solution.

*Brevibacterium flavum* No. 2247–14–5 (ATCC No. 15940) requires isoleucine.

*Brevibacterium flavum* No. 2247–4 (ATCC No. 15941) requires ornithine, but is also able to grow on a medium which contains either citrulline or arginine which are related to ornithine by the Krebs ornithine cycle.

*Brevibacterium flavum* No. 2247–11 (ATCC No. 15942) requires histidine for its growth.

The three mutants referred to above produce proline in otherwise conventional media containing assimilable sources of carbon and nitrogen together with certain growth promoting substances and inorganic ions.

Suitable carbon sources include carbohydrates such as glucose, fructose, sucrose, maltose, starch, starch hydrolysates, molasses, organic acids, and alcohols. Their concentration in the culture medium is normally between 5 and 20% by weight, based on glucose equivalents.

The nitrogen source may be ammonia as a gas or as an aqueous solution, urea, or an ammonium salt such as ammonium phosphate, ammonium nitrate, ammonium acetate, or ammonium lactate. Amino acids, organic bases, and other organic nitrogen bearing materials may be assimilated, but ammonium sulfate is the most economical source of nitrogen and gives the best results.

Depending on the mutant employed, the medium must also include isoleucine, ornithine, citrulline, arginine, or histidine which may be added to the medium in the form of the pure compounds or as their mixtures with other materials derived from natural sources, or in any other form. The concentration of the specific nutrient should be between 5 and 30 mg. per deciliter for high yield.

The growth promoting agents, known in themselves, which are preferably added include various vitamins, fatty acids, yeast extract, and the like. Inorganic materials should be present to provide ions of potassium, magnesium, manganese, iron, phosphoric and sulfuric acid, as is conventional.

The influence af the specific nutrients is illustrated by the following example.

EXAMPLE 1

*Brevibacterium flavum* No. 2247–14–5 was cultured at 31.5° C. in shaking flasks for 63 hours on a medium of the following basic composition:

| | |
|---|---|
| Glucose | percent__ 10 |
| Ammonium sulfate | do____ 5.5 |
| $KH_2PO_4$ | do____ 0.1 |
| $MgSO_4 \cdot 7H_2O$ | do____ 0.04 |
| $Fe^{++}$ | p.p.m__ 2 |
| $Mn^{++}$ | p.p.m__ 2 |
| Biotin | micrograms/liter__ 300 |
| Vitamin $B_1 \cdot HCl$ | do____ 200 |
| $CaCO_3$ (precipitated) | percent__ 5 |
| pH 7. | |

Batches of the medium contained varying amounts of L-isoleucine. A distinct correlation between the amount of isoleucine added to the medium and the concentration of L-proline in the medium after fermentation was established by bioassay of the medium with *Leuconostoc citrovorum*, as is evident from Table 1

*Table 1*

| Initial concentration of L-isoleucine, mg./dl.: | Final concentration of proline, g./dl. |
|---|---|
| 5 | 0.38 |
| 10 | 0.72 |
| 15 | 1.08 |
| 20 | 0.74 |
| 25 | 0.56 |
| 30 | 0.40 |

A similar peak concentration of proline in the culture medium is also found when the other specific nutrients are employed with *Brevibacterium flavum* No. 2247–4 or 2247–11 in concentrations between 5 and 30 mg./dl.

The proline yields obtained are also affected by the amount of ammonium sulfate present, and higher than usual ammonium sulfate concentrations increase the ultimate proline concentration in the culture medium as is shown in the following example.

EXAMPLE 2

*Brevibacterium flavum* No. 2247–14–5 was employed in the fermentation of several batches of a culture medium in shaking flasks at 31.5° C. for 72 hours. The several batches varied in their ammonium sulfate concentration, but were otherwise identical. They contained:

| | |
|---|---|
| Glucose | percent__ 10 |
| $KH_2PO_4$ | do____ 0.04 |
| $MgSO_4 \cdot 7H_2O$ | do____ 0.04 |
| $Fe^{++}$ | p.p.m__ 2 |
| $Mn^{++}$ | p.p.m__ 2 |
| Biotin | micrograms/liter__ 300 |
| Vitamin $B_1 \cdot HCl$ | do____ 200 |
| L-isoleucine | mg./dl__ 15 |
| $CaCO_3$ (precipitated) | percent__ 5 |
| pH 7. | |

The relationship between initial ammonium sulfate concentration and proline yield is evident from Table 2

Table 2

| Initial concentration of ammonium sulfate, percent: | Final concentration of proline, g./dl. |
|---|---|
| 2.0 | 0.75 |
| 2.5 | 0.85 |
| 3.0 | 0.91 |
| 3.5 | 1.01 |
| 4.0 | 1.03 |
| 5.0 | 1.12 |
| 5.5 | 1.20 |
| 6.0 | 1.16 |
| 7.0 | 0.95 |
| 7.5 | 0.81 |
| 8.0 | 0.70 |

The pH of the fermentation medium should be kept between 5.8 and 8.0 by means of a suitable neutralizing agent such as the calcium carbonate, employed in the preceding examples, but ammonia in all forms, urea, sodium hydroxide, potassium hydroxide, and other alkaline materials may also be used.

Aerobic culture conditions are maintained either in shaking flasks or by aeration of deep tanks used with submerged cultures. The temperature should be between 24° C. and 37° C. for good results. The normal fermentation period is between two and three days.

The concentration of L-proline in the fermentation medium may be determined by paper chromatography or by bioassay. A yellow spot appears at Rf 0.42 in paper chromatography in a butanol-acetic acid-water system 4:1:2. The proline may be recovered from the fermentation medium after removal of the bacterial cells by ion exchange resins, by precipitation, or in any other known manner.

The following examples illustrate preferred conditions for carrying out this invention, and it will be understood that the invention is not limited thereto.

EXAMPLE 3

*Brevibacterium flavum* No. 2247–14–5 was used in the fermentation of a medium of the following composition:

| | |
|---|---|
| Glucose (as tapioca hydrolyzate) _____percent__ | 10 |
| Ammonium sulfate _____do____ | 5.5 |
| KH$_2$PO$_4$ _____do____ | 0.1 |
| MgSO$_4$.7H$_2$O _____do____ | 0.04 |
| Fe$^{++}$ _____p.p.m__ | 2 |
| Mn$^{++}$ _____p.p.m__ | 2 |
| L-isoleucine _____mg./dl__ | 15.0 |
| Biotin _____micrograms/liter__ | 450 |
| Vitamin B$_1$.HCl _____do____ | 500 |
| pH 7. | |

20 ml. batches of the medium were separately sterilized in 500 ml. shaking flasks at 110° C. for 3 minutes in an autoclave. 5% separately sterilized CaCO$_3$ were then added, and the medium was inoculated with the microorganisms which had been cultured on bouillon agar slants at 31° C. for 24 hours.

The fermentation was permitted to proceed for 72 hours at 31° C. The final proline content of the medium was 1.51 g./dl., as determined by bioassay with *Leuconostic citrovorum*.

The fermentation medium was filtered to remove the cells. One liter of the filtrate was passed over a column packed with a strong cation exchange resin of the H type. Proline was eluted from the column with hydrochloric acid. The eluate was passed over a column packed with an anion exchange resin, and the eluate, which was free from hydrochloric acid, was evaporated to dryness.

The dry residue was extracted with methanol, and crystalline proline was precipitated from the methanol solution by addition of isopropanol. About 11.3 grams of crude crystals were obtained.

EXAMPLE 4

A culture medium was prepared to the following composition:

| | |
|---|---|
| Glucose (tapioca hydrolyzate) _____percent__ | 10 |
| Ammonium sulfate _____do____ | 5.5 |
| KH$_2$PO$_4$ _____do____ | 0.1 |
| MgSO$_4$.7H$_2$O _____do____ | 0.04 |
| Fe$^{++}$ _____p.p.m__ | 2 |
| Mn$^{++}$ _____p.p.m__ | 2 |
| L-arginine _____mg./dl__ | 15.4 |
| Biotin _____micrograms/liter__ | 300 |
| Vitamin B$_1$.HCl _____do____ | 200 |
| pH 7. | |

The medium was sterilized and mixed with CaCO$_3$, and then inoculated with *Brevibacterium flavum* No. 2247–4. The fermentation was carried out for 72 hours in the same manner as in Example 3. The fermented medium was found to contain approximately 0.75 g./dl. L-proline.

EXAMPLE 5

A culture medium which differed from that used in Example 4 by containing 8.3 mg./dl. L-histidine instead of the L-arginine was sterilized and inoculated with *Brevibacterium flavum* No. 2247–11. The fermentation was carried out as in the preceding Examples 3 and 4. The ultimate L-proline concentration in the medium was 0.54 g./dl.

While the invention has been described with particular reference to specific embodiments, it is to be understood that it is not limited thereto, but is to be construed broadly and restricted solely by the scope of the appended claims.

What we claim is:
1. A method of preparing L-proline by fermentation which comprises culturing an auxotrophic mutant of *Brevibacterium flavum* selected from the strains of the group consisting of *Brevibacterium flavum* No. 2247–14–5 (ATCC No. 15940), *Brevibacterium flavum* No. 2247–4 (ATCC No. 14941), and *Brevibacterium flavum* No. 2247-11 (ATCC No. 15942) on an aqueous culture medium under aerobic conditions at a pH substantially between 5.5 and 8.0 until L-proline is accumulated in said medium, the medium including an assimilable carbon source, an assimilable nitrogen source, and growth promoting agents including at least one member of the group consisting of isoleucine, ornithine, citrulline, arginine, and histidine.

2. A method as set forth in claim 1, wherein the growth promoting agent of said group is present in said medium in an amount between 5 and 30 milligrams per deciliter.

3. A method as set forth in claim 1, wherein said nitrogen source is ammonium sulfate present in said medium in a concentration between 2 and 8 percent.

4. A method of preparing L-proline by fermentation which comprises culturing an auxotrophic mutant of *Brevibacterium flavum* requiring an amino selected from the group consisting of isoleucine, ornithine, citrulline, arginine and histidine for its growth, on an aqueous culture medium under aerobic conditions at a pH substantially between 5.5 and 8.0 until L-proline is accumulated in said medium, the medium including an assimilable carbon source, an assimilable nitrogen source, and growth promoting agents including at least one member of the group consisting of isoleucine, ornithine, citrulline, arginine, and histidine.

No references cited.

A. LOUIS MONACELL, *Primary Examiner.*

L. M. SHAPIRO, *Assistant Examiner.*